United States Patent [19]

Terai et al.

[11] Patent Number: 5,054,276
[45] Date of Patent: Oct. 8, 1991

[54] CUTTING BLADE FOR A MOWING APPARATUS

[75] Inventors: Akio Terai, Machida; Minoru Wada, Tokyo, both of Japan

[73] Assignee: Komatsu Zenoah Company, Tokyo, Japan

[21] Appl. No.: 336,154

[22] Filed: Apr. 11, 1989

[30] Foreign Application Priority Data

Apr. 12, 1988 [JP] Japan .................. 63-48319[U]

[51] Int. Cl.⁵ ............................................. A01D 34/76
[52] U.S. Cl. ..................................... 56/242; 56/255; 56/296
[58] Field of Search ................... 56/11.2, 11.3, 242, 56/255, 258, 295, 296

[56] References Cited

U.S. PATENT DOCUMENTS

| | | | |
|---|---|---|---|
| 1,110,058 | 9/1914 | Hurley | 56/255 |
| 3,472,007 | 10/1969 | Green | 56/11.3 |
| 3,618,304 | 11/1971 | Hundhausen | 56/295 |
| 3,631,658 | 1/1972 | Green | 56/11.3 |
| 4,196,566 | 4/1980 | Donnelley | 56/295 |
| 4,310,999 | 1/1982 | Onoue | 56/295 |

FOREIGN PATENT DOCUMENTS

0257566 3/1988 European Pat. Off. .
3248679 3/1984 Fed. Rep. of Germany .

*Primary Examiner*—Terry L. Melius
*Attorney, Agent, or Firm*—Weiser & Stapler

[57] ABSTRACT

Disclosed herein is a cutting blade for a mowing apparatus, which comprises a pair of first and second pivotal cutting wheels slidably superposed with each other and each provided with a number of grass cutting edges along its circumference, each of the teeth having a major surface, two side edges and an outer periphery edge; and mechanism for reciprocatingly rotating each cutting wheel in opposite directions through a predetermined angle, respectively. At least one of the side edges of each of the teeth of the cutting wheels is defined by an inclined surface forming an acute angle relative to a major surface of the tooth so as to form a cutting edge, and the outer periphery edge is defined by a plane substantially perpendicular to the major surface of the tooth. Namely, there is no sharp edge in the outer peripheries of the teeth of the cutting wheels or the free ends of teeth.

4 Claims, 8 Drawing Sheets

CUTTING BLADE FOR A MOWING APPARATUS

BACKGROUND OF THE INVENTION

1. Field of the Invention

The present invention relates to a cutting blade for a mowing apparatus driven by an engine or the like to mow grass or sprig or the like, and in particular to a cutting blade of a mowing apparatus which comprises a pair of cutting wheels slidably superposed with each other and oscillatingly and reciprocatingly rotating in mutually opposite directions through a predetermined angle, respectively, and each provided with a number of grass cutting teeth, along its circumference at substantially equal intervals, whereby cutting the grass in shear mode as by scissors.

2. Description of the Prior Art

Conventionally, as a cutting blade for a mowing machine for mowing grass or sprig, a single rotatable cutter wheel which is supported by a cutter support body and is driven by an engine or a motor via a drive shaft passed through a hollow pipe connected between the engine and the cutter support body was used. Therefore, when the worker grips two grip portions by both hands and swings the hollow pipe to and fro, it is possible to mow grass by the single rotating cutter wheel.

Figures 1, 2:
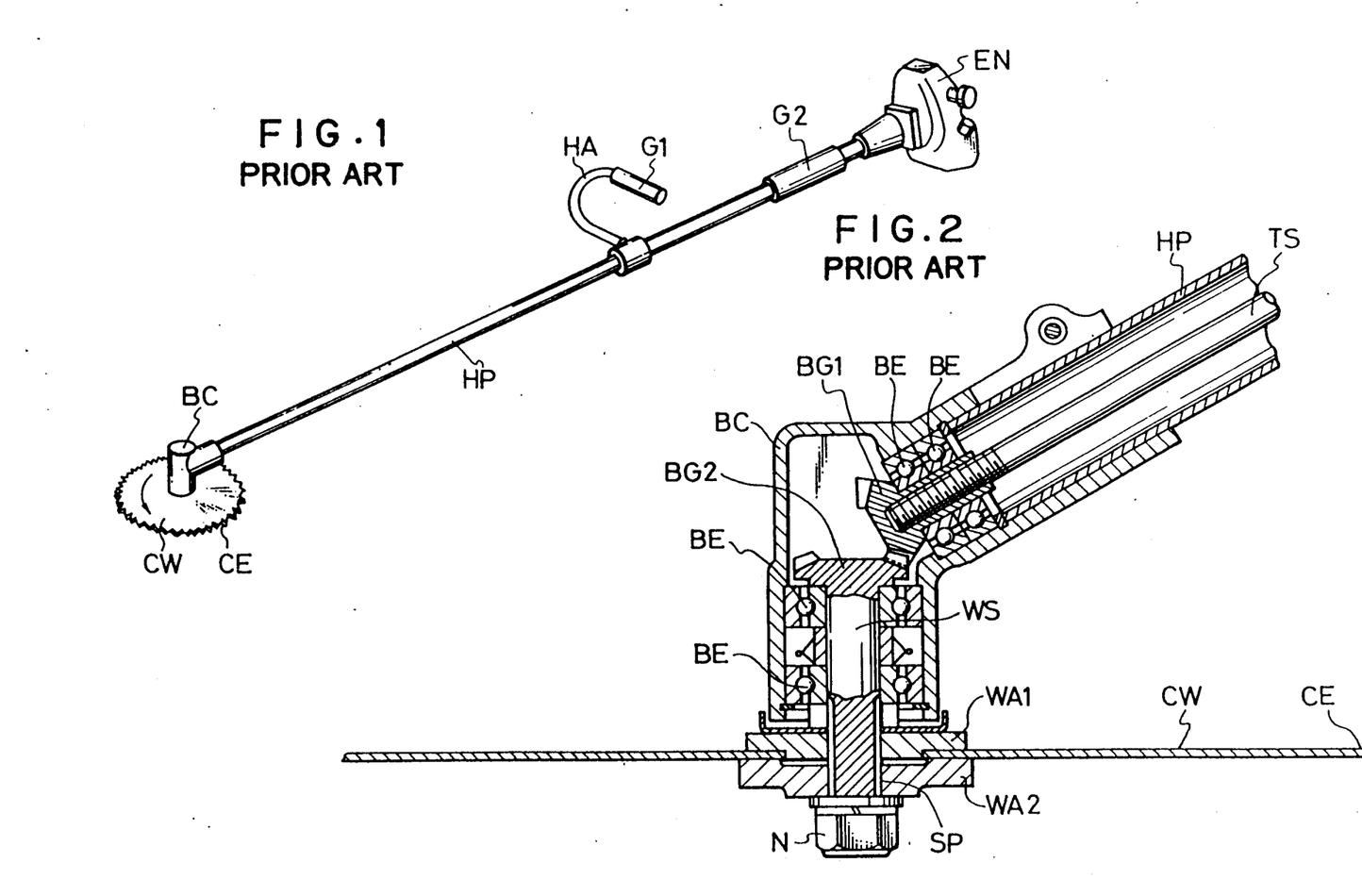
FIG. 1 is a perspective view showing an example of prior-art mowing machine.
FIG. 2 is an enlarged cross-sectional view showing a rotary cutter wheel and a cutter wheel support body of the prior-art mowing machine.

Specifically, as shown in FIG. 1, the conventional mowing apparatus includes a rotary cutting wheel CW having a number of cutting edges CE at the outer periphery thereof. The rotary cutting wheel CW is rotatably supported by a bearing casing BC (cutter support body) and further driven by an engine EN via a transmission shaft rotatably passed through a hollow pipe HP connected between the bearing casing BC and the engine EN. A handle HA including a first grip $G_1$ is fixed at roughly the middle of the hollow pipe HP, and a second grip $G_2$ is directly fitted onto the hollow pipe HP so that the worker can swing the cutting wheel to and fro by griping the grips G1 and G2 by both hands.

In more detail with reference to FIG. 2, the transmission shaft TS driven by the engine EN is rotatably supported by two bearings BE provided on a junction point between the bearing casing BC and the hollow pipe HP. At the lowermost end of the transmission shaft TS, a first bevel gear $BG_1$ is fixed. On the other hand, a wheel shaft WS is also rotatably supported by two bearings BE fixed to the lower side of the bearing casing BC. At the uppermost end of the wheel shaft WS, a second bevel gear $BG_2$ is formed so as to be in mesh with the first bevel gear $BG_1$. The cutting wheel CW is pinched between two washers $WA_1$ and $WA_2$ and fixed to the wheel shaft WS with a spline SP and a nut N.

When the worker grips the two grips $G_1$ and $G_2$ and swings the hollow pipe HP to and fro, grass can be mowed by the cutting wheel CW driven by the engine EN at a relatively high speed.

In the conventional mowing machine, however, since only the single cutter wheel rotates at a relatively high speed, there exist various problems such that pebble-stones may be dangerously kicked off; the machine itself must be swung violently to mow grass; and soft grass usually remains unmowed.

In order to overcome the problems in the conventional mowing machine as set forth above, there were proposed some improved mowing apparatus having a cutting blade comprising two superposed cutting wheels, which are for example disclosed in U.S. Pat. No. 3,631,658, U.S. Pat. No. 3,472,007 or EP Al No. 0 257 566 or the like.

The improved mowing apparatus were very convenient since grass could be cut in shearing mode as by a scissors. However, unfortunately, in the cutting blades of the improved mowing apparatuses, there was another problem. Namely, in the cutting blades, each of the teeth of the cutting blade has an acute angle or the outer periphery edge of each teeth has a cutting edge. This means that dangerousness would be increased when the apparatus is used, since the tip portions of the teeth or the outer peripheries of the teeth are is likely to contact with the worker or the like during the operation thereof, thus leading injury of the worker. Further, there is a possibility that grass unnecessary to be cut may be cut by the cutting edge provided on the outer periphery of the tooth. Furthermore, if the cutting edge of the outer periphery of the tooth is inadvertently brought into contact with a hard object, such as a stone, rock or tree, the cutting edge may be damaged due to its fragile structure, thus impairing the cutting ability of the cutting wheels.

However, it should be noted that in the mowing apparatus having such a blade structure with two superposed cutting wheels which are oscillatingly and reciprocatingly rotated, it is not necessary to provide a cutting edge at the outer periphery of the tooth or to form the tip portion of the tooth acutely, since grass is cut by cutting edges provided on both side edges of each tooth in such a manner as a scissors.

SUMMARY OF THE INVENTION

In view of the problems in the cutting blades of the improved mowing apparatuses, the present invention has been made. Therefore, it is the primary object of the present invention to lessen dangerousness which may be caused in operation of a mowing apparatus which has a cutting blade comprising a pair of cutting wheels slidably superposed with each other and oscillatingly and reciprocatingly rotating in mutually opposite directions through a predetermined angle, respectively, and each provided with a number of cutting teeth.

Another object of the present invention is to improve strength of the tip portion of each tooth of the cutting wheels.

In order to achieve the above-mentioned object, a cutting blade for a mowing apparatus according to the present invention comprises: a pair of first and second pivotal cutting wheels slidably superposed with each other and each provided with a number of cutting teeth along its circumference, each of the teeth having a major surface, two side edges and an outer periphery edge; and mechanism for reciprocatingly rotating each cutting wheel in opposite directions through a predetermined angle, respectively, wherein at least one of the side edges of each teeth of the cutting wheels is defined by an inclined surface forming an acute angle relative to the major surface of the tooth so as to form a cutting edge, and the outer periphery edge is defined by a plane substantially perpendicular to the major surface of the tooth.

According to the present invention having the above structure, since there is no sharp edge in the outer peripheries of the teeth of the cutting wheels or the free ends of the teeth, there is less dangerousness in operation of the cutting blade of the mowing apparatus. Further, it becomes possible to avoid cutting grass unnecessary to be cut by the outer peripheries of the teeth.

Furthermore, since there is no fragile portion on the tip portion of the tooth, the strength of the tooth is improved, namely the teeth of the cutting wheels become more resistant to damages than those of conventional cutting wheels. Moreover, since the process of sharpening the free ends of the edge is omitted, the manufacturing cost is accordingly reduced.

Further, it is also possible to design the cutting wheels such that the teeth of each of the cutting wheels are slightly bent toward the opposite cutting wheel in such a manner that only the tip portions of the teeth of each cutting wheel elastically contact with each other when the cutting wheels are correctly superposed, whereby contacting portions between the teeth of the first and second cutting wheels are displaceable along the profile of each tooth according to the rotational motion of the cutting wheels.

According to the cutting wheel having the above structure, the cutting quality is remarkably improved.

The features and advantages of the mowing apparatus according to the present invention over the prior-art machine will be more clearly appreciated from the following description of the preferred embodiments of the invention taken in conjunction with the accompanying drawings in which like reference numerals designate the same or similar elements or sections throughout the figures thereof and in which:

BRIEF DESCRIPTION OF THE DRAWINGS

FIG. 3 is a perspective view of a first embodiment of the mowing apparatus according to the present invention;

FIG. 4 (A) is a top plan view of the main part of the mowing apparatus in FIG. 3;

FIG. 4 (B) is an enlarged view of the tooth.

FIG. 5 (A) is an enlarged cross-sectional view showing a pair of pivotal cutting wheels and an essential portion of a drive mechanism of the cutting wheels incorporated in the mowing apparatus in FIG. 3;

FIG. 5 (B) is an enlarged cross sectional view of a part of the cutting wheels;

FIG. 12 (A) is a side view showing a bent hollow pipe connected between the bearing casing and the engine and so fixed to the bearing casing so as to be suitable for use in mowing grass on the ground; and FIG. 12 (B) is a similar side view showing the bent hollow pipe fixed to the bearing casing so as to be suitable for use in trimming garden trees.

FIG. 12 (C) is a partial, cross sectional view of portions of the bent hollow pipe illustrated in FIG. 12 (A).

DETAILED DESCRIPTION OF THE PREFERRED EMBODIMENTS

Referring now to the attached drawings FIGS. 3 to 12, embodiments of the present invention will be described.

FIGS. 3 to 7 show an embodiment of the mowing apparatus according to the present invention.

Figures 3, 4A, 4B:
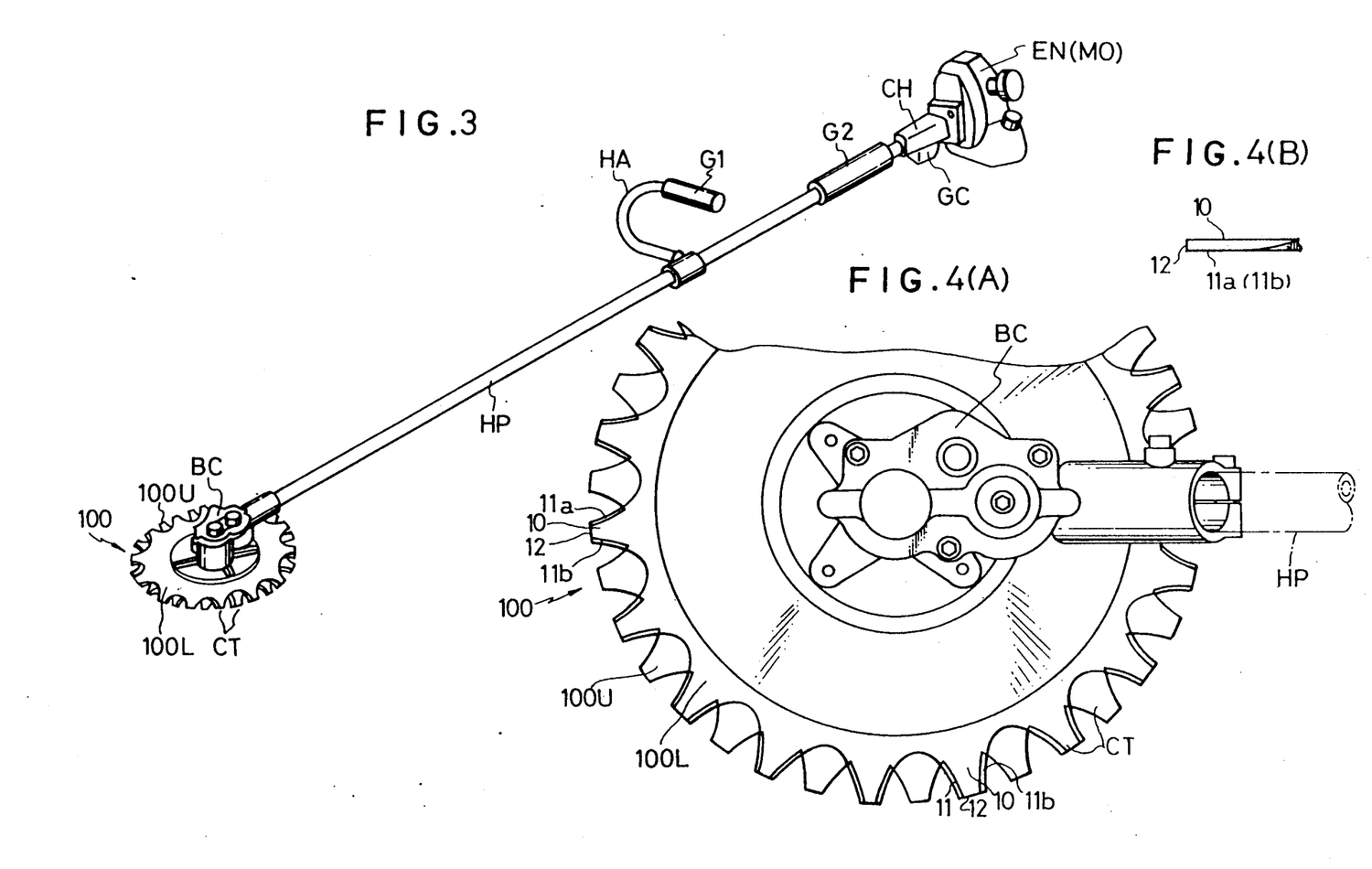

In FIG. 3, an overall view of the mowing apparatus in which a cutting blade according to the present invention is provided. Namely, the apparatus has a cutting blade 100 comprising a pair of upper and lower cutting wheels 100U and 100L. Each of the cutting wheels 100U and 100L has a plurality of cutting teeth CT along its outer periphery thereof. The upper and lower cutting edges 100U and 100L are slidably superposed with each other and pivotally and reciprocationally driven by an engine EN or an electric motor MO in two mutually opposite directions (clockwise and counterclockwise) in order to mow grass between two cutting teeth CT1 and CT2 of the upper and lower cutting wheels 100U and 100L. That is to say, grass can be cut off in shearing mode, which being different from the prior-art cutter wheel which cuts off grass in chopping mode.

Figure 5:
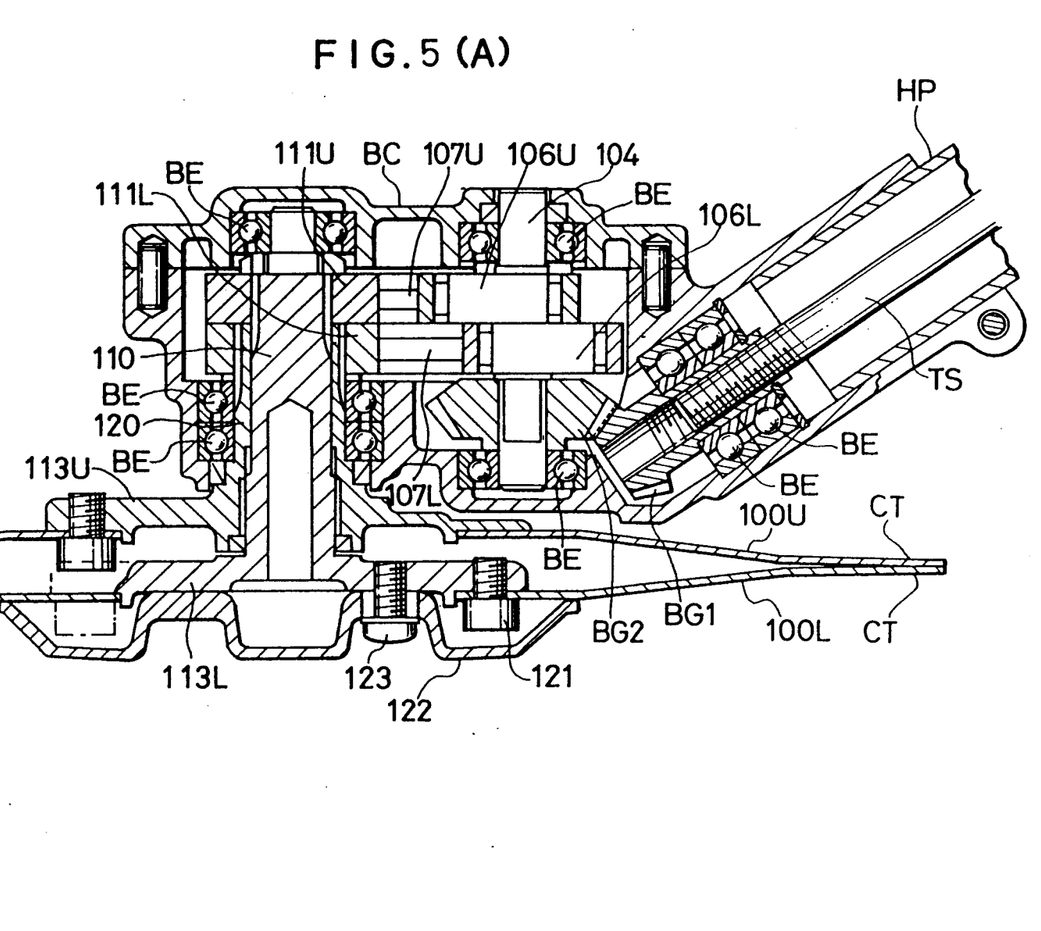

In more detail in FIGS. 4 and 5, a transmission shaft TS is passed through a hollow pipe HP and rotatably supported by a bearing BE fixed to the lower end of the hollow pipe HP. A first bevel gear $BG_1$ is fixedly fitted to a square shaft portion 101 formed at the lower end of the transmission shaft TS as in the prior-art shown in FIG. 2.

Figure 6:
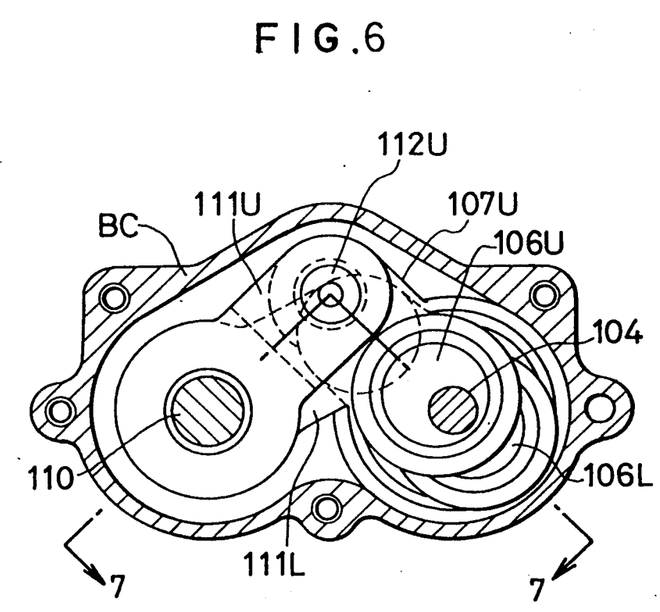
FIG. 6 is a cross-sectional view of the main part in FIG. 5(A)
Figure 7:
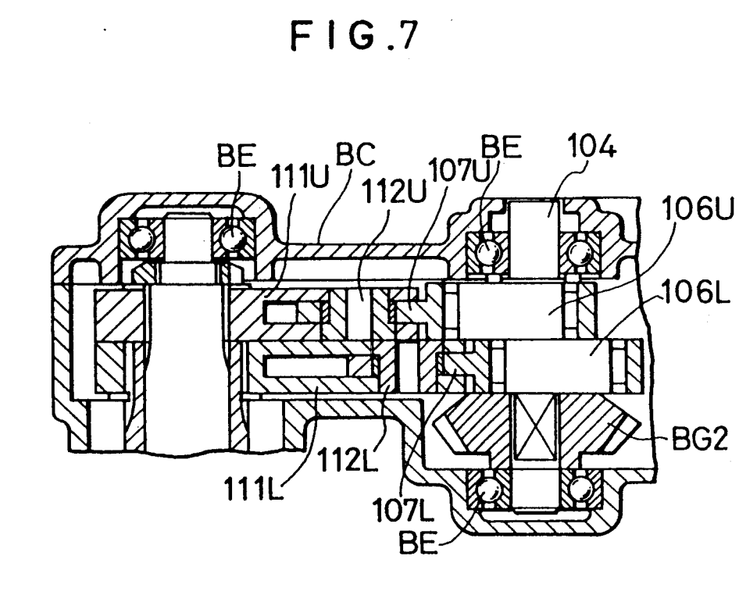
FIG. 7 is a cross-sectional view taken along line 7—7 in FIG. 6.

In FIGS. 5 to 7, a lower cutter wheel support plate 113L is integrally formed on a pivotal center wheel shaft 110, which is rotatably supported on a bearing case BC. On the lower surface of the lower cutter wheel support plate 113L, there is provided a cover 122 for positioning the cutting wheels 100U and 100L to a predetermined height from the surface of the ground. This cover 122 is fixed to the lower cutter wheel support plate 113L with a screw 123 so as to protect a screw head of a screw 121 which fixes the lower cutting wheel 100L to the lower cutter wheel support plate 113L. A second bevel gear $BG_2$ which is in mesh with a first bevel gear $BG_1$ coupled to an end of the transmission shaft TS is fixed to a crank shaft 104 which is rotatably supported in the bearing case BC through bearings BE. Eccentric cam plates 106U and 106L are fixed to the crank shaft 104 integrally. The pivotal center wheel shaft 110 is coupled with an upper arm 111U by means of a spline. A cylindrical member 120 into which the pivotal center wheel shaft is rotatably and coaxially inserted is coupled with a lower arm 111L by means of a spline. As shown in FIGS. 6 and 7, the cam plates 106U and 106L are connected to the upper and lower arms 111U and 111L through an upper and a lower connecting rods 107U, 107L and pins 112U, 112L, respectively. The upper and lower arms 111U, 111L are coupled to the pivotal cutter wheel shaft 110 and the cylindrical member 120, respectively, by means of splines.

An upper and a lower cutting wheels 100U and 100L are formed as a dish-shape, respectively. Each of the cutting wheels has a plurality of cutting teeth along the outer periphery thereof.

As shown in FIGS. 4(A), 4(B) and 5, each of the teeth CT1 has a major surface portion 10 having two side edges 11a and 11b and an outer periphery edge 12 which corresponds to a free end of the tooth. As shown in FIG. 4(B), each of the side edges 11a and 11b is defined by an inclined surface forming an acute angle relative to the major surface 10 of the tooth CT so as to form a cutting edge. On the other hand, the outer periphery edge 12 of the tooth is defined by a plane substantially perpendicular to the major surface 10 of the tooth. Namely, there is no cutting edge on the outer periphery edge 12 of the tooth CT. This means that it is possible to lessen the dangerousness caused by a cutting edge formed on an outer periphery edge of the tooth of the cutting wheels during operation of the mowing apparatus. Further, this is advantageous because even if the outer periphery of the wheels 100U and 100L is applied to a hard object such as a rock, stone, tree or the like the teeth 13 and 14 would not be easily chipped or otherwise damaged thereby. Furthermore, the strength of the tip portion of each tooth can be improved.

Further, as shown in FIGS. 5A and 5B, the circumferential portion of each cutting wheel 100U or 100L in which a plurality of cutting teeth CT are provided is slightly bent toward the opposite cutting wheel.

Therefore, when the upper and the lower cutting wheels 100U, 100L are mated together in such a manner that the cutting teeth CT of each cutting wheel 100U, 100L are overlapped to each other, the cutting wheels 100U and 100L are contacted with each other only at the tip portions of the cutting teeth CT of the cutting wheels 100U and 100L. This condition is shown in FIG. 5(A). On the other hand, when the cutting wheels 100U and 100L are mutually pivoted and the cutting teeth CT of each cutting wheel 100U, 100L are arranged alternately, the tip portions of cutting teeth CT of each cutting wheel 100U, 100L are slightly engaged with each other as shown in FIG. 5 (B), so that contacting points between the side edge 11a of the tooth CT of the upper cutting wheel 100U and the side edge 11b of the tooth CT of the lower cutting wheel 100L are displaceable along the profile of each cutting tooth CE according to the rotational motion of the cutting wheels 110U and 100L. According to the, structure of the cutting wheels described above, a mowing ability of the apparatus is remarkably improved. Further, it becomes possible to prevent grass to be cut from being caught between the cutting wheels.

Figure 8:
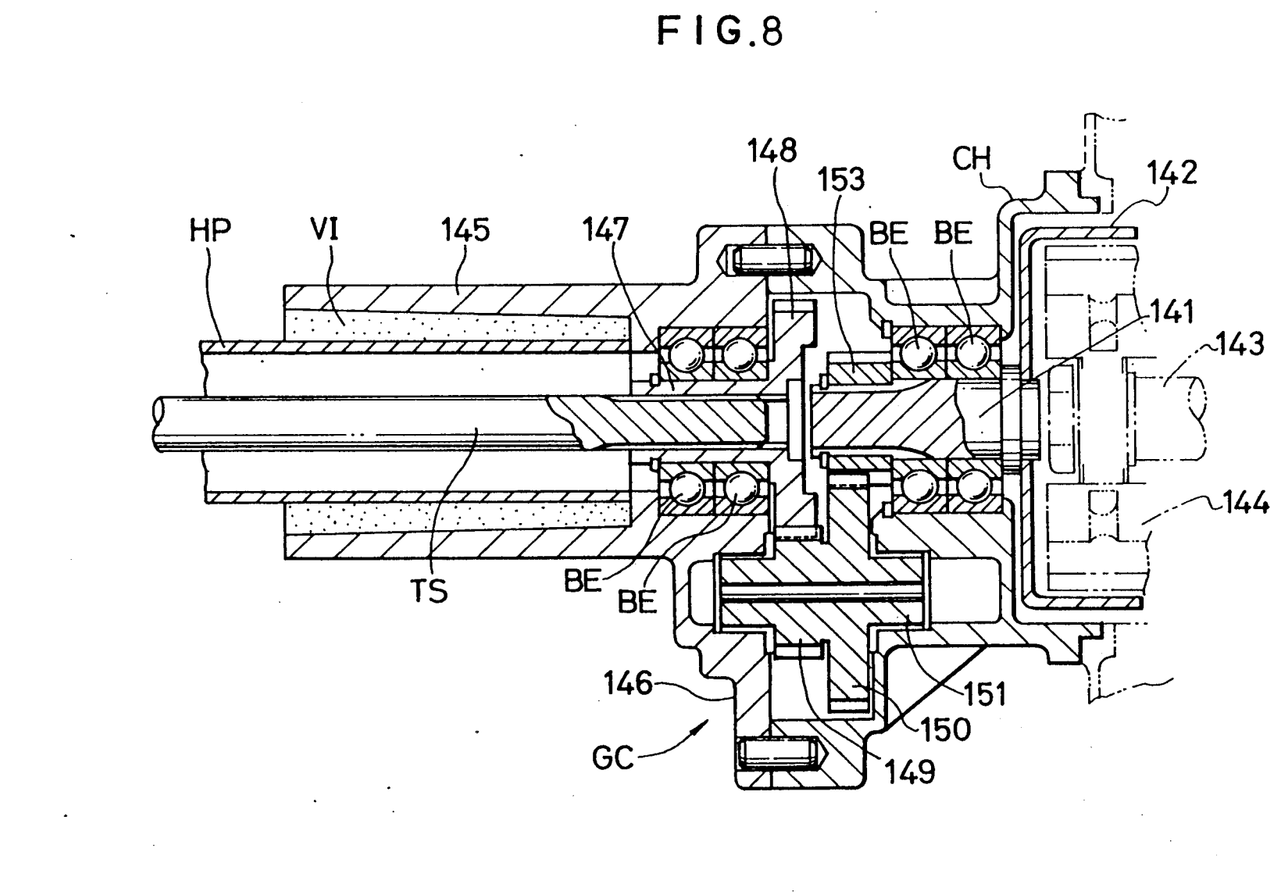
FIG. 8 is a cross-sectional view of a rotational speed reduction-mechanism in FIG. 3.

FIG. 8 shows a rotational speed reduction mechanism of this apparatus. This speed reduction mechanism comprises a clutch housing CH mounted on the front portion of the engine EN. In the clutch housing CH, there is provided a drum shaft 141 rotatably and axially supported by a bearing BE. On the rear end of the drum shaft 141, a clutch drum 142 is mounted. The inner surface of the clutch drum 142 can be abutted by a centrifugal force on the outer circumference of a centrifugal clutch 144 which is provided on the front end of a crank shaft 143 of the engine EN. On the front side of the clutch housing CH, there is fixed a flange portion of a cylindrical connection case 145 to which a rear end portion of a hollow pipe HP is coupled through a rubber vibration insulator VI. In the connection case 145, a gear shaft 147 is rotatably and axially supported by means of a bearing BE. On the front end of the gear shaft 147, a transmission shaft TS which passes through the hollow pipe HP is fixed. On the rear end of the gear shaft 147, a large spur gear 148 is integrally fixed which engages with a small spur gear 149. The small spur gear 149 is integrally fixed onto a shaft 151 rotatably and axially supported in the gear case GC. Onto the shaft 151, a large spur gear 150 is also fixed. The large spur gear 150 is engaged with a small spur gear 153 fixed onto a front end portion of the drum shaft 141. Therefore, a rotational force from the engine EN is reducingly transmitted to the transmission shaft TS through the clutch drum 142, drum shaft 141, the small spur gear 153, the large spur gear 150, the shaft 151, the small spur gear 149 and the large spur gear 158 sequentially.

According to this embodiment, in order to facilitate the operation of the apparatus by reducing the weight of the head portion .thereof where the crank lever mechanism and the cutting .blade or the like are provided as much as possible, the rotational speed reduction mechanism is displaced from the head portion of the apparatus to the portion near to the engine, that is near at hand of the operator.

Figure 9:
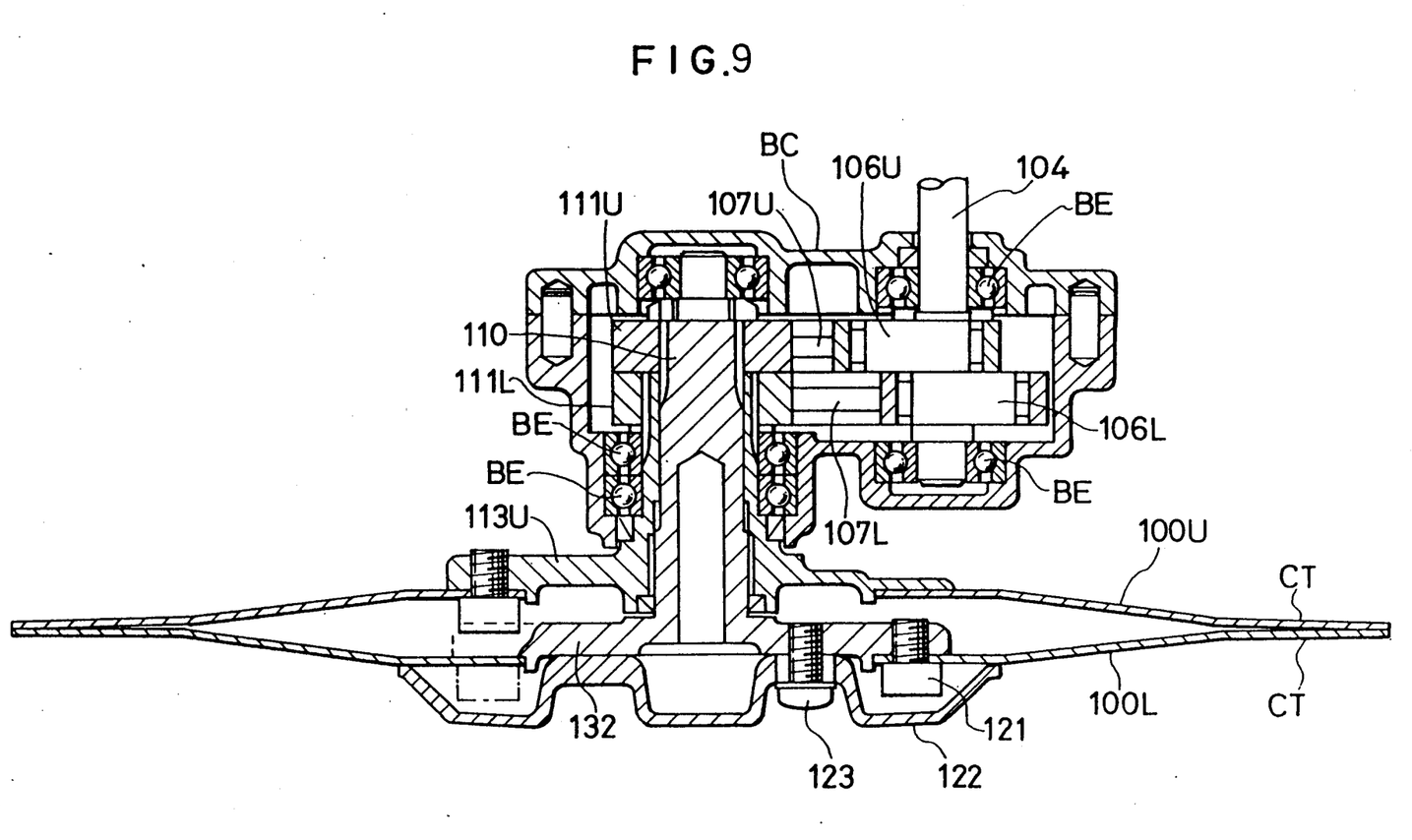
FIG. 9 is a cross-sectional view of a pair of pivotal cutting wheels and an essential portion of a drive mechanism of a second embodiment of the mowing apparatus according the present invention.

FIG. 9 shows a second embodiment of the present invention. In this embodiment, a rotational force from a power source is directly transmitted to the crank shaft 104 without bevel gears. Excepting the structure, this embodiment has the same structure as that of the first embodiment. The mowing apparatus of this embodiment can be used in mowers having a bent hollow pipe through which a flexible cable is rotatably passed. Further, this device can also be used as an attachment of an industrial machine, in which a rotational force is supplied from the upper side of the apparatus to the crank shaft 104.

Figure 10:
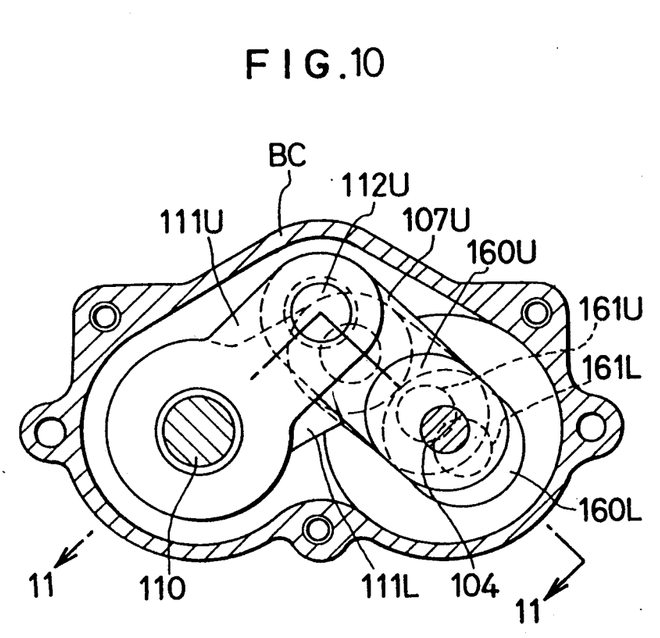
FIG. 10 is a cross-sectional view of the drive mechanism of a third embodiment.
Figure 11:
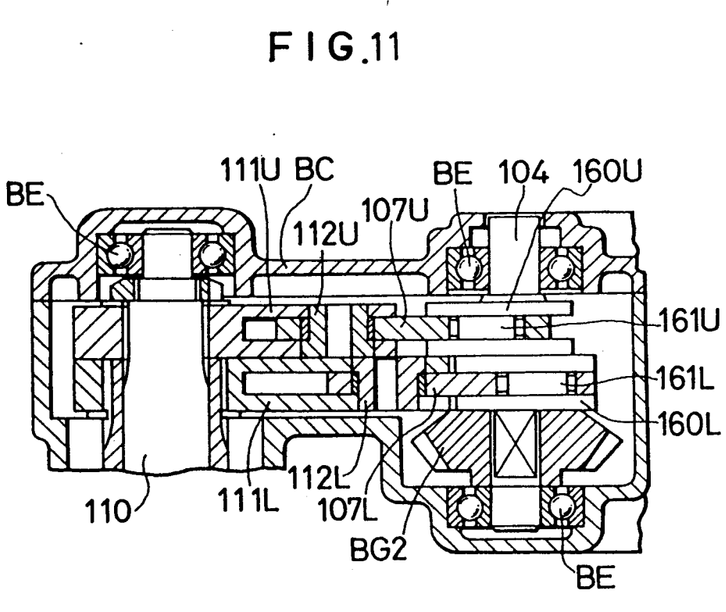
FIG. 11 is a cross-sectional view taken along line 11—11 in FIG. 10.
Figures 12A, 12B, 12C:
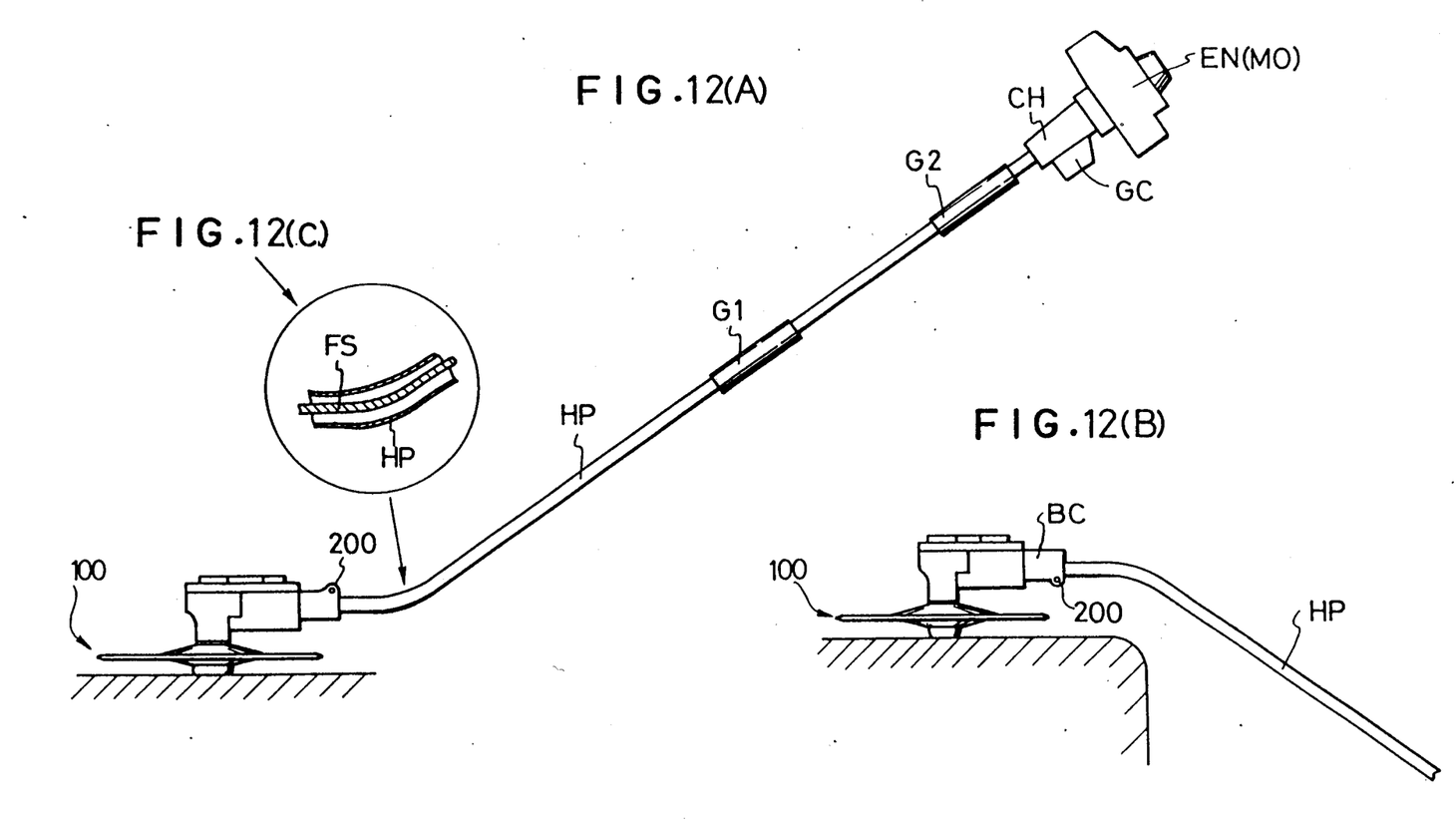

FIGS. 10 and 11 show a third embodiment of the mowing apparatus of the present invention. In this embodiment, a crank lever mechanism comprising crank arms 160U and 160L are provided instead of the two circular eccentric cam plates 106U and 106L as described hereinabove. Namely, on the crank shaft 104, the crank arms 160U and 160L are integrally formed On the crank arm 160U and 160L, crank pins 161U and 161L are eccentrically mounted, respectively, to which connecting rods 107U and 107L are pivotably coupled. The connecting rods 107U, 107L are pivotally coupled with upper and lower arms 111U, 111L, respectively, through pins 112U, 112L. The upper and lower arms 111U, 111L are coupled to the pivotal cutter wheel shaft 110 and the cylindrical member 120, respectively, by means of splines. Therefore, in accordance with the rotation of the crank shaft 104, the upper and lower arms 111U and 111L are mutually pivoted toward the different directions, respectively, through the crank lever mechanism, whereby the cutting wheels 100U and 100L are reciprocatingly pivoted toward the different directions, respectively, as illustrated in FIG. 12(A) (e.g., for mowing grass on the ground) and FIG. 12(B) (e.g., for trimming garden trees).

In the above embodiments, it is possible to drive the cutting wheels by an electrical motor or a hydraulic motor in stead of an engine.

Further, it is also possible to keep one of the wheels stationary while the other disc is either rotated or reciprocated without departing from the spirit of the present invention.

What is claimed is:

1. A cutting blade for a mowing apparatus comprising:
   a pair of first and second pivotal cutting wheels slidably superposed with each other and each including a plurality of cutting teeth along its circumference, each tooth having a major surface, two sides edges and an outer peripheral edge, wherein the side edges of each tooth of the cutting wheels form a profile respectively defined by an inclined surface forming an acute angle relative to the major surface of the tooth so as to form a cutting edge, and wherein the outer peripheral edge is defined by a plane substantially perpendicular to the major surface of the tooth; and means for reciprocatingly rotating the cutting wheels in opposite directions relative to each other through a predetermined angle;

wherein the cutting teeth of each of the cutting wheels are bent slightly toward the opposite cutting wheel so that only tip portions of said cutting teeth of each cutting wheel elastically contact each other when the cutting wheels are correspondingly superposed and the tip portions of the cutting wheels are in engagement with each other when the cutting wheels are mutually pivoted and wherein the cutting teeth of each cutting wheel are intermeshed so that contacting portions of the cutting teeth of the first and second cutting wheels are displaceable along the profile of each cutting edge according to pivotal motion of the cutting wheels.

2. The cutting blade of claim 1, wherein each tooth has a substantially trapezoidal shape having a short parallel side corresponding to the outer periphery of the tooth and oblique sides corresponding to the side edges of the tooth.

3. A cutting blade for a mowing apparatus comprising:

a pair of first and second pivotal cutting wheels slidably superposed with each other and each including a plurality of cutting teeth along its circumference, each tooth having a major surface, two side edges and an outer peripheral edge, wherein the side edges of each tooth of the cutting wheels form a profile respectively defined by an inclined surface forming an acute angle relative to the major surface of the tooth so as to form a cutting edge, and wherein the outer peripheral edge is defined by a plane substantially perpendicular to the major surface of the tooth; and means for reciprocatingly rotating the cutting wheels in opposite direction relative to each other through a predetermined angle;

wherein the cutting teeth of each of the cutting wheels are bent slightly toward, and in elastic contact with, the cutting teeth of the opposite cutting wheel, so that the cutting teeth of the cutting wheels intermesh with one another.

4. The cutting blade of claim 3, wherein the cutting teeth of each of the cutting wheels are in elastic contact with each other so that when the cutting wheels are correspondingly superposed and tip portions of the cutting wheels are in engagement with each other, only tip portions of said cutting teeth are in elastic contact with each other, and when contacting portions of the cutting teeth of the first and second cutting wheels are displaced along the profile of each cutting edge according to pivotal motion of the cutting wheels, said cutting teeth of the cutting wheels are interleaved and in elastic contact with each other.

* * * * *